Dec. 21, 1965  G. W. CLYATT  3,224,805
TRUCK TOP CARRIER
Filed Jan. 30, 1964

INVENTOR.
GLEN W. CLYATT
BY
ATTORNEY 3,224,805
TRUCK TOP CARRIER
Glen W. Clyatt, Phoenix, Ariz.
(2641 South J, Oxnard, Calif.)
Filed Jan. 30, 1964, Ser. No. 341,284
8 Claims. (Cl. 296—10)

The present invention pertains to truck mounted frames, and more particularly, to the type of truck frames referred to as top carriers.

In open top truck types, it is customary to provide openings for stakes or similar devices to provide temporary covering if desired for the truck bed. In many instances, it is desirable to provide a surface for carrying implements while not requiring truck bed space. Accordingly, prior art devices have been designed to fit into the stake holes provided in a truck bed which extend upwardly and provide a top space or carrier. These devices have generally been welded and more or less custom built for each specific truck. Every attempt to make the truck top carriers of the prior art readily removable and suitable for storage met with failure since structural weakness was encountered when attempting to make the top readily removable. Therefore, prior art devices generally could not readily be removed for storage and readily be replaced on the truck when needed.

It is therefore an object of the present invention to provide a truck top carrier that is easily installed.

It is another object of the present invention to provide a truck top carrier that may readily be assembled and disassembled for mounting and dismounting on a truck bed.

It is a further object of the present invention to provide a truck top carrier that may readily be disassembled for packaging and shipping while nevertheless providing, when assembled, a rigid and strong truck top carrier.

It is another object of the present invention to provide a truck top carrier that may be used on a variety of trucks, regardless of make, and may be adjusted to fit a successive number of trucks.

It is still another object of the present invention to provide a truck top carrier that may readily be produced using mass manufacturing techniques to thereby minimize the cost of the truck top carrier.

Briefly, in accordance with one embodiment of the present invention, a truck top carrier is provided utilizing a unique arrangement of gusset plates which provide support for horizontal runners secured to vertically extending stakes at junctions. Cross braces are also provided at each of these junctions and are also tied into the junction through the utilization of the unique gusset plate arrangement. Longitudinal stringers may be utilized, welded at intervals to the horizontal runners, to longitudinally strengthen the runners to provide further rigidity and stability while providing a fence for articles mounted on the top carrier. The gusset arrangement at each junction of the present device may readily be disassembled so that the entire structure may be stored in a fraction of its assembled space and may readily be reassembled with only simple hand tools.

The present invention may more readily be described by reference to the accompanying drawings in which.

Figure 1:
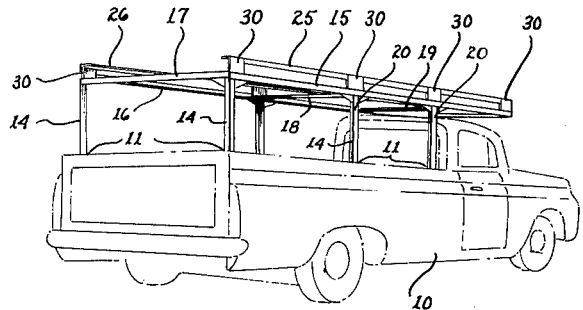
FIG. 1 is a perspective view of a truck top carrier constructed in accordance with the teachings of the present invention mounted on a truck body.

Referring to FIG. 1, a truck body 10 is shown having a plurality of stake holes 11 provided therein. These stake holes are commonly provided in most popular makes of trucks and are to be found in most sizes of trucks from the small pickups to the large "flat-beds." A plurality of vertically extending stakes 14, each manufactured from high-strength steel tubing having a roughly rectangular cross section, extend upwardly from a corresponding one of the stake holes. A pair of horizontal runners 15 and 16 extend longitudinally of the truck body on either side thereof and contact the top of the vertically extending stakes. A plurality of cross braces 17, 18, and 19 are also provided, each extending transversely of the truck bed perpendicular to the horizontal runners, and join the runners and vertically extending stakes at junctions 20. A pair of horizontal stringers 25 and 26 may also be provided extending parallel to a corresponding one of the horizontal runners 15 and 16 respectively and welded thereto through a plurality of plates 30. Each of these plates is welded to the corresponding runner immediately above a junction and to the stringer in contact therewith. These stringers add longitudinal rigidity to the runner as well as providing a fence for implements that may be mounted on top of a top carrier. Plywood or other suitable material may be placed in the openings between the cross braces to provide a solid mounting surface to carry objects. The horizontally extending runners are constructed of angle iron having one side thereof extending horizontally inwardly of the truck bed, and having the second side of the angle extending vertically upwardly on the outside of the bed. In this manner, a "shelf" is provided to support plywood or other foreign material, if desired, in the spaces between the cross braces.

Figure 2:
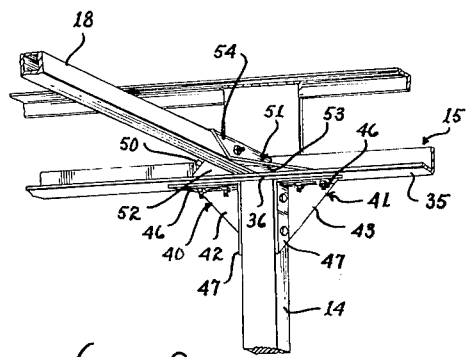
FIG. 2 is a perspective view of a portion of the top carrier of FIG. 1.
Figure 3:
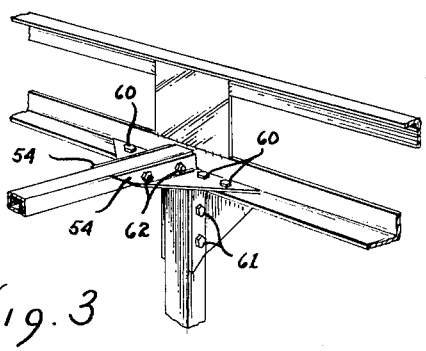
FIG. 3 is another perspective view of a portion of the top carrier of FIG. 1.

Referring to FIGS. 2 and 3, a vertically extending stake 14 intersects perpendicularly with the horizontally extending runner 15. The horizontally extending side 35 of the runner is placed in abutting relationship with the top edge 36 of the vertically extending stake. The cross brace 18 is perpendicular to both the horizontal runner 15 and the vertical stake 14 and rests on the shelf provided by the angle iron of the runner. The cross brace 18, runner 15, and stake 14 are secured to each other through the utilization of four uniquely shaped gusset plates. The gusset plates are formed into two pairs, a vertical and a horizontal pair, each gusset plate of each pair mounted in opposing relation with the opposite member of the pair. The vertical gusset plates 40 and 41 include a web 42 and 43 forming a vertical surface, triangular in shape, extending between the stake 14 and runner 15. A first and second flange 46 and 47 are provided for each gusset plate perpendicular to the surface of the web and are placed in abutting relationship with the side of the stake and the bottom surface of the horizontal runner. A pair of holes to accept bolts are provided in both of the flanges of each vertical gusset plate.

The horizontal gusset plates 50 and 51 are also provided with horizontally extending webs 52 and 53 respectively and perpendicularly extending flanges 54. The webs of the horizontal gusset plates extend horizontally between the runner 15 and the cross brace 18 with the vertically or perpendicularly extending flange 54 in abutting relation with the cross brace 18. A pair of holes are drilled in the flange of the horizontal gusset plate to admit bolts to be secured thereby to the cross brace. A pair of holes are provided along one edge of the web so that the horizontal gusset may be secured to the horizontally extending surface of the angle iron comprising a part of the horizontal runner. It may be noted by an inspection of FIGS. 2 and 3 that the vertically extending bolts 60 secure both the vertical gussets and the horizontal gussets to the horizontal flange of the angle iron; similarly, the horizontally extending bolts 61 secure the vertical gusset plates to the stake and the bolts 62 secure the horizontal gusset plates to the cross brace. The flanges on the vertical gusset plates provide excellent longitudinal stability for the top carrier while adding to the lateral stability afforded by the horizontal gusset plate. It may, therefore, be seen that eight bolts secure the entire junction to provide longitudinal and lateral stability heretofore obtainable only through more complicated joints and junctions or through welded structures. The top carrier of the present invention may readily be disassembled for storage merely by removing the four vertical bolts 60 at each junction to thereby disconnect the horizontal gusset plates and cross braces from the stakes and vertical gusset plates, and from the horizontal runners and stringers; the resulting subassembly may be stored without consuming excessive space since the greatest thickness of the subassembly resulting from the removal of the vertical bolts is the thickness of the flange 35 on the angle iron of the horizontal runner. If the thickness of the subassembly is not critical in storage, then the top carrier of the present invention may be disassembled by removal of the two top horizontal bolts 62 to thereby free the cross brace from the junction. Thus, with the removal of only two bolts, the cross brace may be removed and the top carrier stored in a space substantially less than what would be required if the top carrier were to remain a unitary structure.

Figure 4:
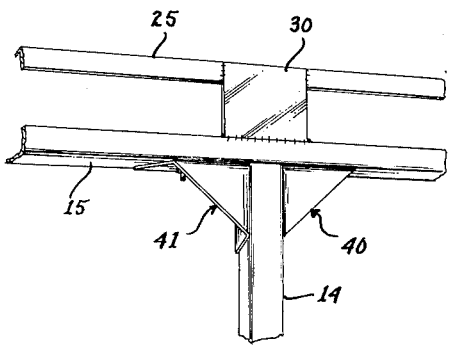
FIG. 4 is an illustration of a junction of the present device as it appears from the outside of the truck body.

Referring to FIG. 4, a further distinct advantage of the present invention may be seen. It will be noted that there are no bolts, protrusions, nuts, or other irregularities in the surface presented by the outside of the top carrier of the present invention. The smooth outside surfaces of the top carrier of the present invention are not merely for appearances; rather, the lack of protrusions or other obstacles on the outside of the framework prevents snagging of clothing which would otherwise occur in those frequent instances requiring a workman to climb alongside the top carrier for removal of equipment stored thereon. Further, when the top carrier is used to support a canvas or other flexible top fabric to thereby protect the contents of the truck, the smooth exterior surface of the framework provided by the top carrier of the present invention prevents snagging and tearing of the fabric.

Figure 5:
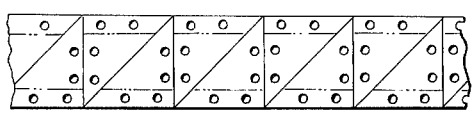
FIG. 5 is a schematic illustration of a sheet of strip steel illustrating the manner in which a portion of the present invention is manufactured.
Figure 6:
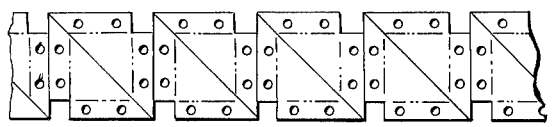
FIG. 6 is a schematic illustration of a sheet of strip steel illustrating the manner in which another portion of the present invention may be manufactured.

The novel gusset plate arrangement of the present invention also permits the manufacture of the gusset plates through mass production techniques. Referring to FIGS. 5 and 6, the horizontal gusset plates and vertical gusset plates, as they would appear in a sheet of appropriately sized steel, are shown. The horizontal gusset plates may be formed from a continuous strip of steel merely by cutting and punching (usually a one step operation) as shown in solid lines in FIG. 5. The triangular pieces thus formed may then be bent along the dotted lines of FIG. 5 to form the horizontal gusset plates shown in FIGS. 2 and 3. Similarly, the continuous sheet of steel shown in FIG. 6 may be cut and punched along the solid lines shown therein and subsequently bent along the dotted lines to form the vertical gusset plates shown in FIGS. 2 and 3. The simplicity of the present invention permits mass production techniques to be implemented to form portions of the combination of the present invention. The unusual and unexpected rigidity provided by the gusset arrangement of the present invention belies the facility with which the junction may be disassembled and the top carrier removed from the truck for storage.

Another distinct feature of the present invention is the adaptability it affords since it may be used on several makes of trucks with only minor adjustment. For example, when the truck top carrier of the present invention is purchased for use on a particular make of truck, the horizontal runners will be provided with appropriate holes to enable the vertically extending stakes to be positioned properly relative to the stake holes in the sides or bed of the truck. The horizontal runner will also be provided with a plurality of auxiliary holes so that by merely choosing the appropriate holes the junctions may be chosen to correctly align the stakes with the stake holes of any make truck.

It will therefore be obvious to those skilled in the art that many modifications may be made in the particular embodiment chosen for illustration and set forth above without departing from the spirit and scope of the present invention.

What is claimed is:
1. A truck top carrier comprising:
 (A) a first and a second group of vertically extending stakes;
 (B) a pair of horizontal runners each connected to a different one of said groups of stakes, each connection forming a junction;
 (C) a plurality of cross braces each extending from the junction of a vertically extending stake of one of said groups and one of said horizontal runners to the junction of a vertically extending stake of the other of said groups and the other of said horizontal runners;
 (D) two vertical gusset plates and two horizontal gusset plates for each of said junctions;
 (E) said vertical gusset plates comprising:
  (1) a vertical web
  (2) a first flange perpendicular to said vertical web in abutting relation with the stake of said junction
  (3) a second flange perpendicular to said first flange and to said web in abutting relation with the runner of said junction
 (F) said horizontal gusset plates comprising:
  (1) a horizontal web
  (2) a flange perpendicular to said horizontal web in abutting relation with the cross brace of said junction.
2. A truck top carrier comprising:
 (A) a first and second group of vertically extending stakes mounted on either side of a truck bed and positioned opposite each other;
 (B) a pair of horizontal runners each connected to a different one of said groups of stakes, each connection forming a junction;
 (C) a plurality of cross braces each extending from the junction of a vertically extending stake of one of said groups and one of said horizontal runners to the junction of a vertically extending stake of the other of said groups and the other of said horizontal runners;
 (D) two vertical gusset plates and two horizontal gusset plates for each of said junctions;
 (E) said vertical gusset plates comprising:
  (1) a vertical web forming a surface parallel to the stake and to the runner of one of said junctions
  (2) a first flange perpendicular to said vertical web in abutting relation with the stake of said junction
  (3) a second flange perpendicular to said first flange and to said web in abutting relation with the runner of said junction
 (F) said horizontal gusset plates comprising:
  (1) a horizontanl web forming a surface parallel to the cross brace and to the runner of one of said junctions
  (2) a flange perpendicular to the horizontal web in abutting relation with the cross brace of said junction.

3. A truck top carrier comprising:
(A) a first and a second group of vertically extending stakes;
(B) a pair of horizontal runners each connected to a different one of said groups of stakes, each connection forming a junction;
(C) a plurality of cross braces each extending from the junction of a vertically extending stake of one of said groups and one of said horizontal runners to the junction of a vertically extending stake of the other of said groups and the other of said horizontal runners;
(D) two vertical gusset plates and two horizontal gusset plates for each of said junctions;
(E) said vertical gusset plates comprising:
    (1) a vertical web
    (2) a first flange perpendicular to said vertical web in abutting relation with the stake of said junction
    (3) a second flange perpendicular to said first flange and to said web in abutting relation with the runner of said junction
    (4) means removably securing the first flange of both vertical gusset plates to the stake of said junction
(F) said horizontal gusset plates comprising:
    (1) a horizontal web
    (2) a flange perpendicular to said horizontal web in abutting relation with the cross brace of said junction
    (3) means removably securing the flange of each horizontal gusset plate to the cross brace of said junction.

4. A truck top carrier comprising:
(A) a first and second group of vertically extending stakes mounted on either side of a truck bed and positioned opposite each other;
(B) a pair of horizontal runners each connected to a different one of said groups of stakes, each connection forming a junction;
(C) a plurality of cross braces each extending from the junction of a vertically extending stake of one of said groups and one of said horizontal runners to the junction of a vertically extending stake of the other of said groups and the other of said horizontal runners;
(D) two vertical gusset plates and two horizontal gusset plates for each of said junctions;
(E) said vertical gusset plates comprising:
    (1) a vertical web forming a surface parallel to the stake and to the runner of one of said junctions
    (2) a first flange perpendicular to said vertical web in abutting relation with the stake of said junction
    (3) a second flange perpendicular to said first flange and to said web in abutting relation with the runner of said junction
    (4) means removably securing the first flange of both vertical gusset plates to the stake of said junction
(F) said horizontal gusset plates comprising:
    (1) a horizontal web forming a surface parallel to the cross brace and to the runner of one of said junctions
    (2) a flange perpendicular to the horizontal web in abutting relation with the cross brace of said junction
    (3) means removably securing the flange of each horizontal gusset plate to the cross brace of said junction.

5. A truck top carrier comprising:
(A) a first and second group of vertically extending stakes;
(B) a pair of horizontal runners each connected to a different one of said groups of stakes, each connection forming a junction;
(C) a plurality of cross braces each extending from the junction of a vertically extending stake of one of said groups and one of said horizontal runners to the junction of a vertically extending stake of the other of said groups and the other of said horizontal runners;
(D) two vertical gusset plates and two horizontal gusset plates for each of said junctions;
(E) said vertical gusset plates comprising:
    (1) a vertical web
    (2) a first flange perpendicular to said vertical web in abutting relation with the stake of said junction
    (3) a second flange perpendicular to said first flange and to said web in abutting relation with the runner of said junction
    (4) means removably securing the first flange of both vertical gusset plates to the stake of said junction
(F) said horizontal gusset plates comprising:
    (1) a horizontal web
    (2) a flange perpendicular to said horizontal web in abutting relation with the cross brace of said junction
    (3) means removably securing the flange of each horizontal gusset plate to the cross brace of said junction
    (4) means removably securing the second flange of each vertical gusset plate and the horizontal web of a horizontal gusset plate to the runner of said junction.

6. A truck top carrier comprising:
(A) a first and second group of vertically extending stakes;
(B) a pair of horizontal runners each connected to a different one of said groups of stakes, each connection forming a junction;
(C) a plurality of cross braces each extending from the junction of a vertically extending stake of one of said groups and one of said horizontal runners to the junction of a vertically extending stake of the other of said groups and the other of said horizontal runners;
(D) two vertical gusset plates and two horizontal gusset plates for each of said junctions;
(E) said vertical gusset plates comprising:
    (1) a vertical web
    (2) a first flange perpendicular to said vertical web in abutting relation with the stake of said junction
    (3) a second flange perpendicular to said first flange and to said web in abutting relation with the runner of said junction
    (4) means removably and simultaneously securing the first flange of both vertical gusset plates to the stake of said junction
(F) said horizontal gusset plates comprising:
    (1) a horizontal web
    (2) a flange perpendicular to said horizontal web in abutting relation with the cross brace of said junction
    (3) means removably and simultaneously securing the flange of each horizontal gusset plate to the cross brace of said junction.

7. A truck top carrier comprising:
(A) a first and second group of vertically extending stakes mounted on either side of a truck bed and positioned opposite each other;
(B) a pair of horizontal runners each connected to a different one of said groups of stakes, each connection forming a junction;
(C) a plurality of cross braces each extending from the junction of a vertically extending stake of one of said groups and one of said horizontal runners to the junction of a vertically extending stake of the other of said groups and the other of said horizontal runners;
(D) two vertical gusset plates and two horizontal gusset plates for each of said junctions;
(E) said vertical gusset plates comprising:
  (1) a vertical web forming a surface parrallel to the stake and to the runner of one of said junctions
  (2) a first flange perpendicular to said vertical web in abutting relation with the stake of said junction
  (3) a second flange perpendicular to said first flange and to said web in abutting relation with the runner of said junction
  (4) means removably and simultaneously securing the first flange of both vertical gusset plates to the stake of said junction
(F) said horizontal gusset plates comprising:
  (1) a horizontal web forming a surface parallel to the cross brace and to the runner of one of said junctions
  (2) a flange perpendicular to said horizontal web in abutting relation with the cross brace of said junction
  (3) means removably and simultaneously securing the flange of each horizontal gusset plate to the cross brace of said junction.

8. A truck top carrier comprising:
(A) a first and second group of vertically extending stakes mounted on either side of a truck bed and positioned opposite each other;
(B) a pair of horizontal runners each connected to a different one of said groups of stakes, each connection forming a junction;
(C) a plurality of cross braces each extending from the junction of a vertically extending stake of one of said groups and one of said horizontal runners to the junction of a vertically extending stake of the other of said groups and the other of said horizontal runners;
(D) two vertical gusset plates and two horizontal gusset plates for each of said junctions;
(E) said vertical gusset plates comprising:
  (1) a vertical web forming a surface parallel to the stake and to the runner of one of said junctions
  (2) a first flange perpendicular to said vertical web in abutting relation with the stake of said junction
  (3) a second flange perpendicular to said first flange and to said web in abutting relation with the runner of said junction
  (4) means removably and simultaneously securing the first flange of both vertical gusset plates to the stake of said junction
(F) said horizontal gusset plates comprising:
  (1) a horizontal web forming a surface parallel to the cross brace and to the runner of one of said junctions
  (2) a flange perpendicular to said horizontal web in abutting relation with the cross brace of said junction
  (3) means removably and simultaneously securing the flange of each horizontal gusset plate to the cross brace of said junction
  (4) means removably and simultaneously securing the second flange of each vertical gusset plate and the horizontal web of a corresponding horizontal gusset plate to the runner of said junction.

References Cited by the Examiner

UNITED STATES PATENTS

| | | | |
|---|---|---|---|
| 1,704,883 | 3/1929 | Cullinan | 296—9 |
| 2,015,879 | 10/1935 | Twente | 296—10 |
| 2,788,096 | 4/1957 | Franks | 189—36 |
| 2,841,437 | 7/1958 | Turpin | 296—10 |
| 2,947,566 | 8/1960 | Tower | 224—29 |
| 3,029,101 | 4/1962 | Cook | 296—12 |

GERALD M. FORLENZA, *Primary Examiner.*

HUGO O. SCHULZ, *Examiner.*